United States Patent
Wen et al.

(10) Patent No.: US 11,055,240 B2
(45) Date of Patent: Jul. 6, 2021

(54) DATA PROCESSING METHOD AND DEVICE FOR PERFORMING A CONVOLUTION OPERATION

(71) Applicant: Shenzhen Intellifusion Technologies Co., Ltd., Shenzhen (CN)

(72) Inventors: Bo Wen, Guangdong (CN); Qingxin Cao, Guangdong (CN); Wei Li, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/253,625

(22) PCT Filed: Oct. 30, 2019

(86) PCT No.: PCT/CN2019/114332
§ 371 (c)(1),
(2) Date: Dec. 18, 2020

(87) PCT Pub. No.: WO2020/134529
PCT Pub. Date: Jul. 2, 2020

(65) Prior Publication Data
US 2021/0124698 A1    Apr. 29, 2021

(30) Foreign Application Priority Data

Dec. 29, 2018  (CN) .......................... 201811654890.2

(51) Int. Cl.
*G06F 13/16* (2006.01)
*G06T 1/60* (2006.01)
(Continued)

(52) U.S. Cl.
CPC ............ *G06F 13/1673* (2013.01); *G06F 5/12* (2013.01); *G06F 13/1678* (2013.01); *G06F 17/15* (2013.01); *G06T 1/60* (2013.01)

(58) Field of Classification Search
None
See application file for complete search history.

(56) References Cited

U.S. PATENT DOCUMENTS 10,460,416 B1 *  10/2019  Sirasao ..................... G06T 1/20
10,528,640 B2 *   1/2020  Park ....................... G06N 3/063
(Continued)

FOREIGN PATENT DOCUMENTS

CN    106910168 A  *  6/2017
CN    108171317 A  *  6/2018
(Continued)

OTHER PUBLICATIONS

'CS231n Convolutional Neural Networks for Visual Recognition' archived from Nov. 2018. (Year: 2018).*
(Continued)

*Primary Examiner* — Steven G Snyder

(57) ABSTRACT

A data processing method comprises: if detecting that a number of image data to be transferred is greater than zero wherein the number of image data is a product of a number of input image data and a number of output image data, and a first available storage space of a FIFO memory is greater than or equal to a storage space occupied by an N number of input image data, transferring the N input image data in a first memory to the first FIFO memory; if detecting that a number of weight data to be transferred is greater than zero wherein the number of weight data is a product of the number of input image data and the number of output image data, and a second available storage space of a second FIFO memory is greater than or equal to a storage space occupied by an M number of weight data, transferring the M weight data in a second memory to the second FIFO memory; when the number of input image data cached in the first FIFO memory and the number of weight data cached in the second FIFO memory are greater than or equal to 1, performing a
(Continued)

convolution operation on input image data i read from the first FIFO memory and weight data w read from the second FIFO memory to obtain output image data corresponding to an output index of the weight data w, wherein N, M, i, and w are integers.

9 Claims, 6 Drawing Sheets

(51) Int. Cl.
*G06F 5/12* (2006.01)
*G06F 17/15* (2006.01)

(56) References Cited

U.S. PATENT DOCUMENTS

| | | | | |
|---|---|---|---|---|
| 10,726,330 | B2* | 7/2020 | Ferdman | G06F 17/15 |
| 2016/0379109 | A1* | 12/2016 | Chung | G06F 15/7803 |
| | | | | 706/26 |
| 2018/0341621 | A1* | 11/2018 | Park | G06F 5/06 |
| 2019/0114499 | A1* | 4/2019 | Delaye | G06F 17/153 |
| 2019/0147324 | A1* | 5/2019 | Martin | G06N 3/063 |
| | | | | 706/15 |
| 2019/0147325 | A1* | 5/2019 | Martin | G06N 3/04 |
| | | | | 706/15 |
| 2019/0147326 | A1* | 5/2019 | Martin | G06N 3/063 |
| | | | | 706/15 |
| 2019/0147327 | A1* | 5/2019 | Martin | G06F 17/15 |
| | | | | 706/15 |
| 2019/0220734 | A1* | 7/2019 | Ferdman | G06N 3/063 |
| 2019/0311253 | A1* | 10/2019 | Chung | G06N 3/04 |
| 2020/0026498 | A1* | 1/2020 | Sumbul | G06F 12/0811 |
| 2020/0034148 | A1* | 1/2020 | Sumbul | G06F 9/30141 |
| 2020/0082246 | A1* | 3/2020 | Shao | G06N 3/082 |
| 2020/0257500 | A1* | 8/2020 | Kim | G06F 13/1673 |
| 2020/0293867 | A1* | 9/2020 | Shao | G06F 9/3001 |

FOREIGN PATENT DOCUMENTS

| | | | | | |
|---|---|---|---|---|---|
| CN | 108984148 | A | | 12/2018 | |
| CN | 110192220 | A | * | 8/2019 | G06F 9/5005 |
| CN | 110390384 | A | * | 10/2019 | |
| CN | 111767994 | A | * | 10/2020 | |
| EP | 3306478 | A1 | * | 4/2018 | G06F 12/0607 |
| EP | 3637326 | A1 | * | 4/2020 | G06N 3/063 |
| EP | 3680827 | A1 | * | 7/2020 | G06T 1/60 |

OTHER PUBLICATIONS

'Indexed Operations for Non-rectangular Lattices Applied to Convolutional Neural Networks' by Mikael Jacquemont et al., VISAPP, 14th International Conference on Computer Vision Theory and Applications, Feb. 2019. (Year: 2019).*

'Low Complexity Multiply Accumulate Unit for Weight-Sharing Convolutional Neural Networks' by James Garland et al., IEEE Computer Architecture Letters, vol. 16, No. 2, Jul.-Dec. 2017. (Year: 2017).*

* cited by examiner

DATA PROCESSING METHOD AND DEVICE FOR PERFORMING A CONVOLUTION OPERATION

1. CROSS-REFERENCE TO RELATED APPLICATION

This application claims priority to Chinese Patent Application No. 201811654890.2, entitled "DATA PROCESSING METHOD AND DEVICE" and filed on Dec. 29, 2018, the content of which is hereby incorporated by reference in its entirety.

BACKGROUND

2. Technical Field

The present disclosure generally relates to computer technologies field, and especially relates to a data processing method and a data processing device.

3. Description of Related Art

An instruction Set Simulator (ISS) is an important part of a processor tool chain. A conventional instruction set simulator not only needs to simulate hardware behavior (hardware functions) of the processor, but also needs to accurately predict a time that the processor will take to run a program. Therefore, data processing of the conventional instruction set simulator must be limited by a clock and a hardware bus bandwidth. If a size of image data to be processed is 4096 bits (bit), and a hardware bus bandwidth of the processor is 256 bits, in this way, during the instruction set simulator simulation process, the image data with a size of 256 bits can only be processed at most once so that the image data with a size of 4096 bits is needed to be processed for 16 times. Therefore, when designing some processors with large amount of computation, such as a neural network processor used to perform computational of convolution neural network, due to large amount of computation and high bandwidth demand of such processors, the data processing speed is very slowly when the hardware functions of the processors are simulated by the conventional instruction set simulator, which is not conducive to quick verify the hardware functions of the processors.

SUMMARY

The technical problems to be solved: in view of the shortcomings of the related art, the present disclosure provides to a data processing method and a data processing device, which can improve a data processing speed of an instruction set simulator and facilitate to quick verify hardware functions of a processor.

In a first aspect, a data processing method according to an embodiment of the present disclosure includes:

if it is detected that a number of image data to be transferred is greater than zero wherein the number of image data is a product of a number of input image data and a number of output image data, and a first available storage space of a first first-in first-out (FIFO) memory is greater than or equal to a storage space occupied by an N number of input image data, transferring the N input image data in a first memory to the first FIFO memory;

if it is detected that a number of weight data to be transferred is greater than zero wherein the number of weight data is a product of the number of input image data and the number of output image data, and a second available storage space of a second FIFO memory is greater than or equal to a storage space occupied by an M number of weight data, transferring the M weight data in a second memory to the second FIFO memory; and wherein each weight data includes input indexes of input image data and output indexes of output image data;

when the number of input image data cached in the first FIFO memory and the number of weight data cached in the second FIFO memory are respectively greater than or equal to 1, performing a convolution operation on input image data i read from the first FIFO memory and weight data w read from the second FIFO memory to obtain output image data corresponding to an output index of the weight data w, and an input index of the weight data w corresponding to the input image data i, wherein N, M, i, and w are integers.

In a second aspect, a data processing device according to an embodiment of the present disclosure includes:

a first transferring module configured to transfer an N number of input image data in a first memory to a first first-in first-out (FIFO) memory when it is detected that a number of image data to be transferred is greater than zero wherein the number of image data is a product of a number of input image data and a number of output image data, and a first available storage space of the first FIFO memory is greater than or equal to a storage space occupied by the N input image data;

a second transferring module configured to transfer an M number of weight data in a second memory to a second FIFO memory when it is detected that a number of weight data to be transferred is greater than zero wherein the number of weight data is a product of the number of input image data and the number of output image data, and a second available storage space of the second FIFO memory is greater than or equal to a storage space occupied by the M weight data; and wherein each weight data includes input indexes of input image data and output indexes of output image data;

a convolution module configured to perform a convolution operation on input image data i read from the first FIFO memory and weight data w read from the second FIFO memory, to obtain output image data corresponding to an output index of the weight data w, when the number of the input image data cached in the first FIFO memory and the number of the weight data cached in the second FIFO memory are respectively greater than or equal to 1, and wherein an input index of the weight data w is corresponding to the input image data i, and N, M, i, and w are integers.

In a third aspect, a terminal according to an embodiment of the present disclosure includes a processor, a memory connected to the processor and storing computer programs with program instructions which is performed by the processor to implement the data processing method in the first aspect.

In a fourth aspect, a computer readable storage medium according to an embodiment of the present disclosure is configured to store computer programs with program instructions which is performed by a processor to implement the data processing method in the first aspect.

The present disclosure includes: when it is detected that the number of image data to be transferred is greater than zero and the first available storage space of the first first-in first-out (FIFO) memory is greater than or equal to the storage space occupied by the N input image data, transferring the N input image data in the first memory to the first FIFO memory; when it is detected that the number of weight data to be transferred is greater than zero and the second available storage space of the second FIFO memory is greater than or equal to the storage space occupied by the M weight data, transferring the M weight data in the second memory to the second FIFO memory; and when the number of input image data cached in the first FIFO memory and the number of weight data cached in the second FIFO memory are respectively greater than or equal to 1, performing the convolution operation on the input image data i read from the first FIFO memory and the weight data w read from the second FIFO memory to obtain the output image data corresponding to the output index of the weight data w. Because the conventional instruction set simulator is mainly to simulate hardware functions of a processor (such as the hardware function of a neural network processor is a convolution function) and hardware cycles (that is, the time it takes for a processor to run out of a program). If the instruction set simulator simulates both hardware functions and hardware cycles, data processing during the instruction set simulator simulation process must be realized according to requirements of hardware, that is, it must be limited by a bandwidth of a hardware bus. However, in many cases, hardware capabilities of the processor is needed to be quickly verified, if it is stilled to use the conventional instruction set simulator at this time, it is bound to fail to achieve the purpose of rapid inspection due to limitations of the hardware bandwidth. Therefore, a data processing method according to an embodiment of the present disclosure is provided for the instruction set simulator simulation process. It is only needed to simulate hardware functions, so that a data processing speed of the instruction set simulator simulation process can be improved by adopting a large-granularity data processing way, so as to fast verify hardware functions of the processor.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

A data processing method and a data processing device according to an embodiment of the present disclosure are illustrated in conjunction with FIGS. 1-6.

Figure 1:
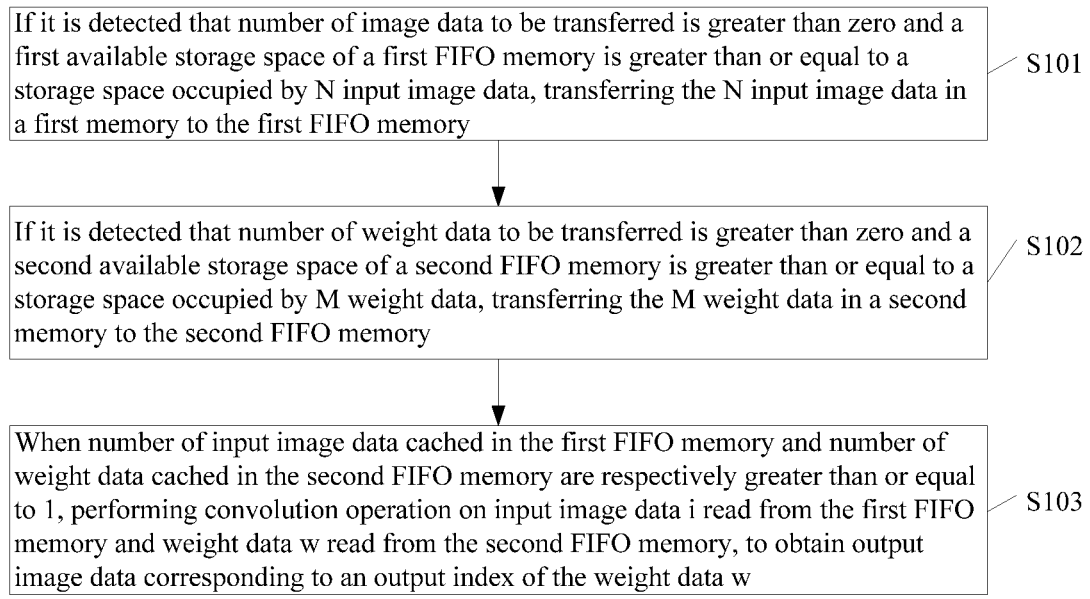
FIG. 1 is a flowchart of a data processing method in accordance with an embodiment of the present disclosure.

FIG. 1 illustrates a flowchart of a data processing method in accordance with an embodiment of the present disclosure. The data processing method includes the following steps:

S101, if it is detected that a number of image data to be transferred is greater than zero wherein the number of image data is a product of a number of input image data and a number of output image data, and a first available storage space of a first first-in first-out (FIFO) memory is greater than or equal to a storage space occupied by an N number of input image data, transferring the N input image data in a first memory to the first FIFO memory;

In some feasible embodiments, a terminal is configured to receive input image data and then store the received input image data in the first memory in order. The terminal is configured to preset a total number of image data to be transferred, the total number of image data to be transferred can be a product of a number of input image data and a number of output image data. Wherein, since the embodiment of the present disclosure can be applied to an instruction set simulator simulation, and the instruction set simulator simulation process is: inputting preset input image data into the instruction set simulator and then performing data processing on the present input image data to obtain the output image data after the instruction set simulator data processing, and then, the output image data after instruction set simulator data processing is compared with preset output image data, so as to evaluate hardware functions of the processor simulated by the instruction set simulator. Therefore, in an embodiment of the present disclosure, both the number of input image data and the number of output image data are preset. The terminal is configured to detect whether the number of image data to be transferred is greater than zero. When the number of image data to be transferred is greater than zero, the terminal is configured to detect whether available storage spaces exist in the first FIFO memory, that is, detecting whether the storage spaces of the first FIFO memory are full. When the available storage space is detected to exist in the first FIFO memory, it is indicated that the storage space of the first FIFO memory is not full. The terminal is configured to detect whether the first available storage space of the first FIFO memory is greater than or equal to the storage space occupied by the N input image data. When the first available storage space of the first FIFO memory is greater than or equal to the storage space occupied by the N input image data, the terminal can read the N input image data from the first memory and then transfer to the first FIFO memory via a direct memory access (DMA). After the N input image data is transferred to the first FIFO memory by the terminal, the terminal can subtract the N input image data from the number of image data to be transferred so as to obtain a new number of image data to be transferred. Furthermore, the first memory can be a double data rate synchronous dynamic random access memory (DDR SDRAM). The first memory is configured to store the input image data received by the terminal, and a size of each input image data in the first memory is equal, that is, a storage space occupied by each input image data is equal. One input image data can represent all data of an input image. After the data is read from the first memory, the data stored in the first memory can't be changed. The first FIFO memory is configured to cache transferred input image data. A width of the first FIFO memory is definite, that is, an amount of cacheable data per row in the first FIFO memory is equal. N is an integer greater than or equal to 1.

Figure 2A:
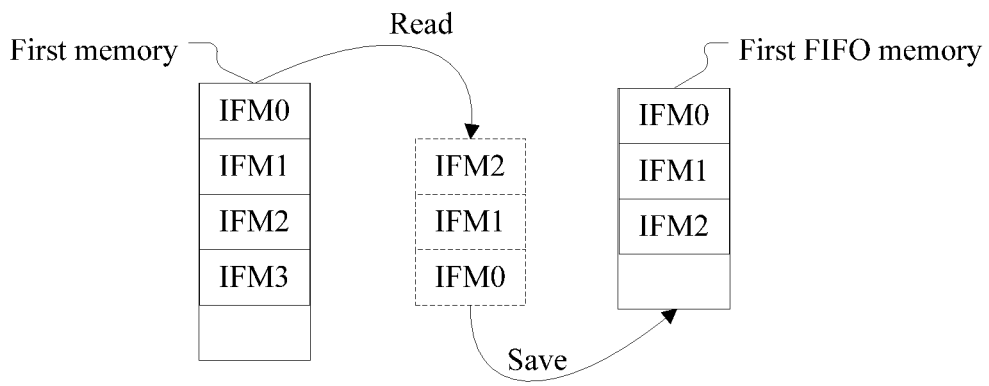
FIG. 2a is a schematic diagram of a single input image data transfer of an embodiment of the present disclosure.

For example, FIG. 2a illustrates a schematic diagram of a single input image data transfer of an embodiment of the present disclosure. Taking four input image data and four output image data as an example, the number of image data to be transferred is sixteen by multiplying four and four. IFM0, IFM1, IFM2 and IFM3 are respectively represented four input image data. It is assumed that N is 3, a storage space occupied by one input image data is 128 bits, and the first available storage space of the first FIFO memory is 512 bits. Since the number of image data to be transferred is sixteen greater than zero, and the first available storage space is 512 bits greater than the storage space occupied by three input image data with a size of 384 bits equal to multiply 3 and 128, therefore, the terminal is configured to read three input image data (IFM0, IFM1, IFM2) from the first memory and then transfer them to the first FIFO memory sequentially via the DMA, and then, after the image data is transferred, the available storage space of the first FIFO memory is 128 bits equal to 384 subtract from 512, and the number of image data to be transferred is equal to thirteen equal to subtract three from sixteen.

S102, if it is detected that a number of weight data to be transferred is greater than zero wherein the number of weight data is a product of the number of input image data and the number of output image data, and a second available storage space of a second FIFO memory is greater than or equal to a storage space occupied by an M number of weight data, transferring the M weight data in a second memory to the second FIFO memory.

In some feasible embodiments, the terminal is configured to receive input weight data and then store the weight data in a second memory in order. The terminal is configured to obtain the number of weight data in the second memory and then determine the number of weight data as a total number of weight data to be transferred. Wherein, the number of weight data can be a product of the number of input image data and the number of output image data. The terminal is configured to detect whether the number of weight data to be transferred is greater than zero. When the number of weight data to be transferred is greater than zero, the terminal is configured to further detect whether available storage spaces exist in the second FIFO memory, that is, detecting whether the storage spaces of the second FIFO memory is full. When the available storage space is detected to exist in the second FIFO memory, it is indicated that the storage space of the second FIFO memory is not full. The terminal is configured to detect whether a second available storage space of the second FIFO memory is greater than or equal to the storage space occupied by the M weight data. When the second available storage space of the second FIFO memory is greater than or equal to the storage space occupied by the M weight data, the terminal can read the M weight data from the second memory and then transfer to the second FIFO memory via the direct memory access (DMA). After the M weight data is transferred to the second FIFO memory by the terminal, the terminal can subtract the M weight data from the number of weight data to be transferred so as to obtain a new number of weight data to be transferred. Furthermore, each weight data can include input indexes of one input image data and output indexes of one output image data. The second memory can also be a DDR SDRAM and be configured to store the weight data received by the terminal. After the data is read from the second memory, the data stored in the second memory can't be changed. The second FIFO memory is configured to cache the transferred weight data. A width of the second FIFO memory is definite, that is, an amount of cacheable data per row in the second FIFO memory is equal. Due to a small amount of the weight data, in order to facilitate to read the weight data, each weight data in the second memory and the second FIFO memory can independently correspond to a row address. M is an integer greater than or equal to 1.

Figure 2B:
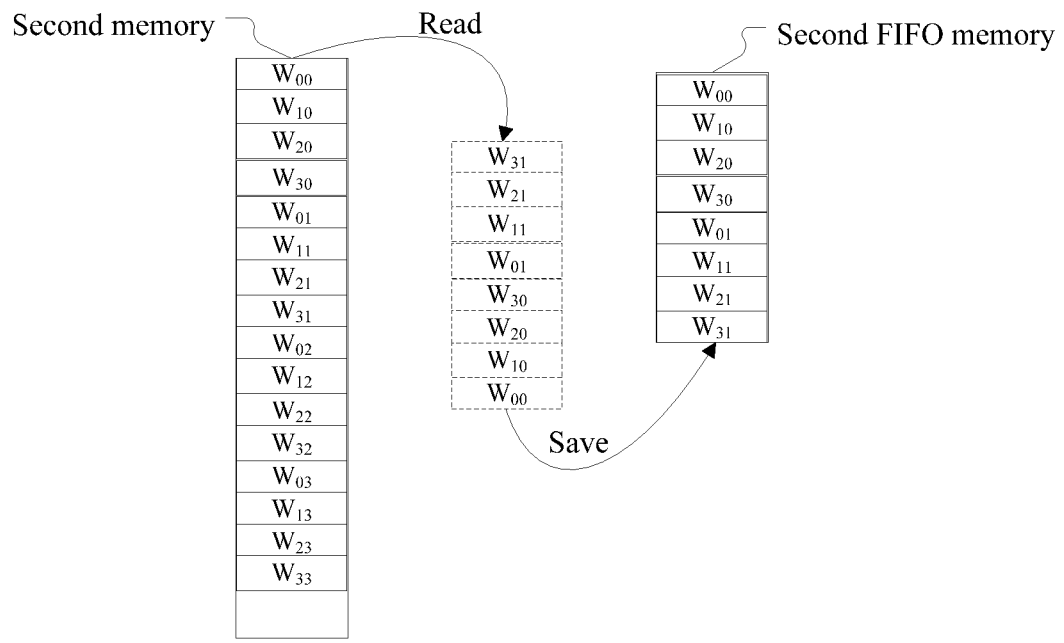
FIG. 2b is a schematic diagram of a single weight data transfer of an embodiment of the present disclosure.

For example, FIG. 2b illustrates a schematic diagram of a single weight data transfer of an embodiment of the present disclosure. Taking four input image data and four output image data as an example, the number of weight data is sixteen equal to multiply four and four, and a total number of weight data to be transferred is sixteen. Wherein, the weight data represents by $W_{xy}$, a subscript x of $W_{xy}$ represents an input index of the input image data, and a subscript y of $W_{xy}$ represents an output index of the output image data. The first memory includes sixteen weight data $W_{00}$, $W_{10}$, $W_{20}$, $W_{30}$, $W_{01}$, $W_{11}$, $W_{21}$, $W_{31}$, $W_{02}$, $W_{12}$, $W_{22}$, $W_{32}$, $W_{03}$, $W_{13}$, $W_{23}$ and $W_{33}$. It is assumed that M is eight, one weight data is corresponding to one row address. It is assumed that the storage space corresponding to the one row address is 64 bits, and the storage space occupied by the one weight data is also 64 bits. It is assumed that the second available storage space of the second FIFO storage is 512 bits. Since the number of weight data to be transferred is sixteen greater than zero, and the second available storage space is 512 bits equal to the storage space occupied by the eight weight data with a size of 512 bits equal to multiply 8 and 64, therefore, the terminal is configured to read the eight weight data (that is, eight rows of weight data) from the second memory and then transfer to the second FIFO memory sequentially via the DMA. And then, after the weight data is transferred, a size of available storage spaces existing in the second FIFO memory is zero bit equal to 512 subtract from 512, so that there is no available storage space existing in the second FIFO memory. The number of image data to be transferred is eight equal to subtract eight from sixteen.

In some feasible embodiments, the step S101 and the step S102 can be performed in parallel, which isn't limited in embodiments of the present disclosure.

S103, when the number of input image data cached in the first FIFO memory and the number of weight data cached in the second FIFO memory are respectively greater than or equal to 1, performing a convolution operation on input image data i read from the first FIFO memory and weight data w read from the second FIFO memory to obtain output image data corresponding to an output index of the weight data w; wherein i and w are integers.

In some feasible embodiments, the terminal is configured to obtain the number of input image data cached in the first FIFO memory and the number of weight data cached in the second FIFO memory, respectively. When the number of input image data cached in the first FIFO memory and the number of weight data cached in the second FIFO memory are respectively greater than or equal to 1, it is indicated that an amount of cached data in the FIFO memory meets an amount of data required by convolution operation, then the terminal can read the input image data i from the first FIFO memory and the weight data w from the second FIFO memory. The terminal is configured to obtain a partial sum (referring to a partial sum of the output image data) of the input image data i and the weight data w after performing a multiplication and accumulation operation on the input image data i and the weight data w, and perform the accumulation operation on the partial sum of the output image data and a plurality of partial sums corresponding to output indexes of the weight data w, so as to obtain the output image data corresponding to the output index of the weight data w. In the instruction set simulator data processing process, the present disclosure is only configured to simulate hardware functions of the processor (that is, convolution operation), a plurality of input image data or a plurality of weight data can be transferred to the FIFO memory at a time, and it is performed convolution operation on one input image data and one weight data at a time, which is not limited by the hardware bus bandwidth during performing data transfer. Therefore, the data processing speed of the instruction set simulator can be improved so as to conveniently and quickly verify hardware functions of the processor. Furthermore, a width of the second FIFO memory is definite, that is, an amount of cacheable data per row in the second FIFO memory is equal. A size of each output image data is equal, that is, a storage space occupied by each output image data is equal. One output image data can be represented all data of an output image.

Figure 2C:
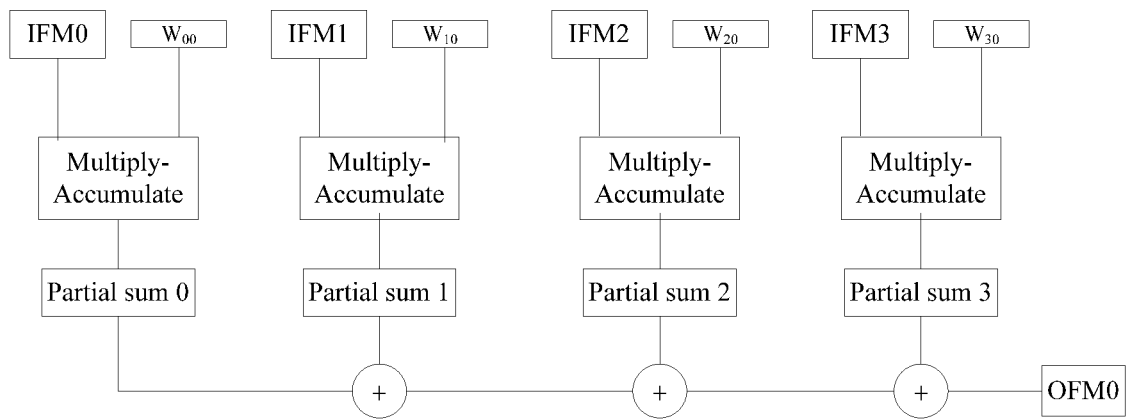
FIG. 2c is a schematic diagram of convolution operation of an embodiment of the present disclosure.

For example, FIG. 2c illustrates a schematic diagram of convolution operation of an embodiment of the present disclosure. Taking one output image data OFM0 as an example. It is assumed that there are totally four input image data and four output image data, and the number of weight data is sixteen equal to multiply four and four. IFM0, IFM1, IFM2 and IFM3 are respectively represented four input image data, and OFM0, OIFM1, OIFM2 and OIFM3 are respectively represented four output image data. The terminal is configured to read one input image data IFM0 from the first FIFO memory and one weight data $W_{00}$ from the second FIFO memory, and perform multiplication and accumulation operation on the input image data IFM0 and the weight data $W_{00}$ to obtain a partial sum 0 of the input image data IFM0 corresponding to an output index 0 of the weight data $W_{00}$. The partial sum 0 is taken as a partial sum of a next accumulation operation. And then, the terminal is further configured to read another input image data IFM1 from the first FIFO memory and another weight data $W_{10}$ from the second FIFO memory, and perform multiplication and accumulation operation on the input image data IFM1 and the weight data $W_{10}$ to obtain a partial sum 1 of the output image data OFM0 corresponding to the output index 0. It is performed accumulation operation on the partial sum 0 and the partial sum 1 to take as a partial sum of a next accumulation operation. Furthermore, the terminal is configured to read another input image data IFM2 from the first FIFO memory and another weight data $W_{20}$ from the second FIFO memory, and perform multiplication and accumulation operation on the input image data IFM2 and the weight data $W_{20}$ to obtain a partial sum 2 of the output image data OFM0 corresponding to the output index 0. It is performed accumulation operation on a previous partial sum (that is the sum of the partial sum 0 and the partial sum 1) and the partial sum 2 to take as a partial sum of a next accumulation operation. The terminal is configured to read another input image data IFM3 from the first FIFO memory and another weight data $W_{30}$ from the second FIFO memory, and perform multiplication and accumulation operation on the input image data IFM3 and the weight data $W_{30}$ to obtain a partial sum 3 of the output image data OFM0 corresponding to the output index 0. It is performed accumulation operation on a previous partial sum (that is, the sum of the partial sum 0, the partial sum 1 and the partial sum 2) and the partial sum 3 of the output image data OFM0 to obtain a complete output image data OFM0.

In an embodiment of the present disclosure, when the terminal detects that the number of image data to be transferred is greater than zero and the first available storage space of the first FIFO memory is greater than or equal to the storage space occupied by the N input image data, transferring the N input image data in the first memory to the first FIFO memory; when it is detected that the number of weight data to be transferred is greater than zero and the second available storage space of the second FIFO memory is greater than or equal to the storage space occupied by the M weight data, transferring the M weight data in the second memory to the second FIFO memory; and when the number of input image data cached in the first FIFO memory and the number of weight data cached in the second FIFO memory are respectively greater than or equal to 1, performing the convolution operation on the input image data i read from the first FIFO memory and the weight data w read from the second FIFO memory to obtain the output image data corresponding to the output index of the weight data w, which can improve the data processing speed of the instruction set simulator and facilitate to quick verify hardware functions of the processor.

Figure 3:
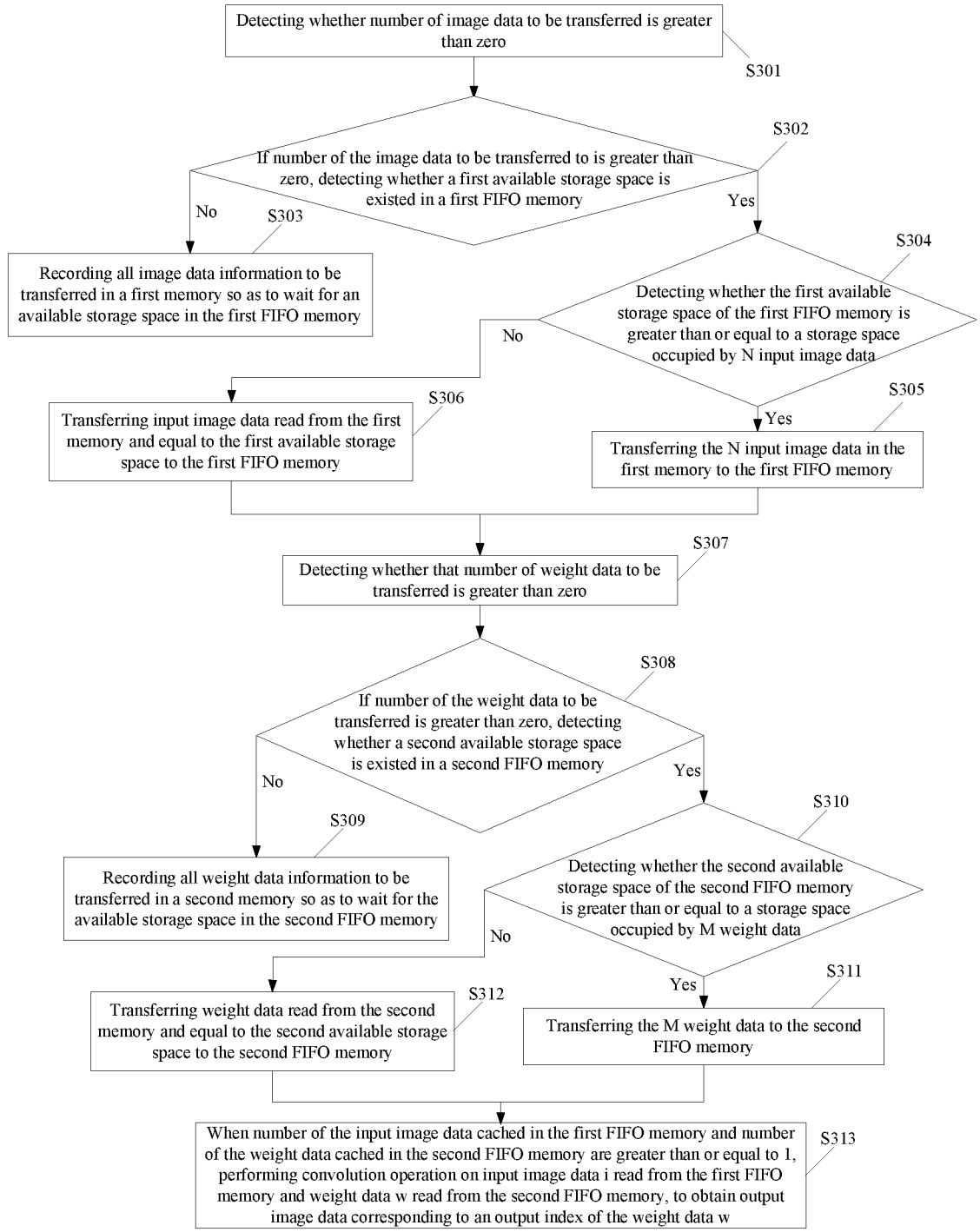
FIG. 3 is a flowchart of a data processing method in accordance with another embodiment of the present disclosure.

FIG. 3 illustrates a flowchart of a data processing method in accordance with another embodiment of the present disclosure. The data processing method includes the following steps:

S301, detecting whether a number of image data to be transferred is greater than zero, wherein the number of image data is a product of a number of input image data and a number of output image data.

S302, if the number of image data to be transferred to is greater than zero, detecting whether a first available storage space exists in a first FIFO memory.

S303, if there is no first available storage space existing in the first FIFO memory, recording all image data information to be transferred in a first memory so as to wait for an available storage space existing in the first FIFO memory.

S304, if the first available storage space exists in the first FIFO memory, detecting whether the first available storage space of the first FIFO memory is greater than or equal to a storage space occupied by an N number of input image data.

S305, if the first available storage space is greater than or equal to the storage space occupied by the N input image data, transferring the N input image data in the first memory to the first FIFO memory.

S306, if the first available storage space is smaller than the storage space occupied by the N input image data, transferring input image data read from the first memory and equal to a size of the first available storage space to the first FIFO memory.

In some feasible embodiments, a terminal is configured to receive input image data and then store the image data in the first memory in order. The terminal is configured to preset a total number of image data to be transferred, the total number of image data to be transferred can be a product of the number of input image data and the number of output image data. Furthermore, during the instruction set simulator simulation process, both the number of input image data and the number of output image data are preset. The terminal is configured to detect whether the number of image data to be transferred is greater than zero. When the number of image data to be transferred is equal to zero, the input image data is stopped to be transferred. When the number of image data to be transferred is greater than zero, the terminal is configured to detect whether the first available storage space exists in the first FIFO memory. That is, detecting whether the first available storage space of the first FIFO memory is full. When there is no first available storage space existing in the first FIFO memory, it is indicated that the first available storage space of the first FIFO memory is full, the terminal is configured to record all image data information to be transferred in the first memory so as to wait for the available storage space to exist in the first FIFO memory. Furthermore, the image data information to be transferred can include the number of image data to be transferred (from 1 to ni*no), input indexes of the input image data (that is, an input index of the input image data that is being transferred at a time of a write failure, from 0 to ni−1), output indexes of the output image data (that is, the input image data that is being transferred at a time of a write failure is used to calculate an output index of which output image data, from 0 to no−1), row indexes of the input image data (that is, a row index of the input image data that is being transferred at a time of a write failure, from zero to the pixel number of the input image data along a vertical direction subtracting one), and key registers such as a read address of the first memory. Wherein, ni is represented the total number of input image data, and no is represented the total number of output image data. When there is the available storage space in the first FIFO memory at a next time, the input image data can be transferred according to that the image data information to be transferred is recorded in the first memory.

When the first available storage space exists in the first FIFO memory, it is indicated that the storage space of the first FIFO memory is not full. The terminal is configured to detect whether the first available storage space of the first FIFO memory is greater than or equal to a storage space occupied by the N input image data. When the first available storage space of the first FIFO memory is greater than or equal to the storage space occupied by the N input image data, the terminal can read the N input image data from the first memory and then transfer to the first FIFO memory by a direct memory access (DMA). When the first available storage space of the first FIFO memory is smaller than the storage space occupied by the N input image data, the terminal can read input image data equal to a size of the first available storage space, from the first memory and then transfer to the first FIFO memory by the direct memory access (DMA). After the input image data is transferred to the first FIFO memory by the terminal, the terminal can subtract a number of transferred image data from the number of image data to be transferred so as to obtain a new number of image data to be transferred. Furthermore, a size of each input image data in the first memory is equal, that is, the storage space occupied by the each input image data is equal. Meanwhile, after data is read from the first memory, the data stored in the first memory can't be changed. A width of the first FIFO memory is definite, that is, an amount of cacheable data per row in the first FIFO memory is equal. N is an integer greater than or equal to 1.

Figure 4A:
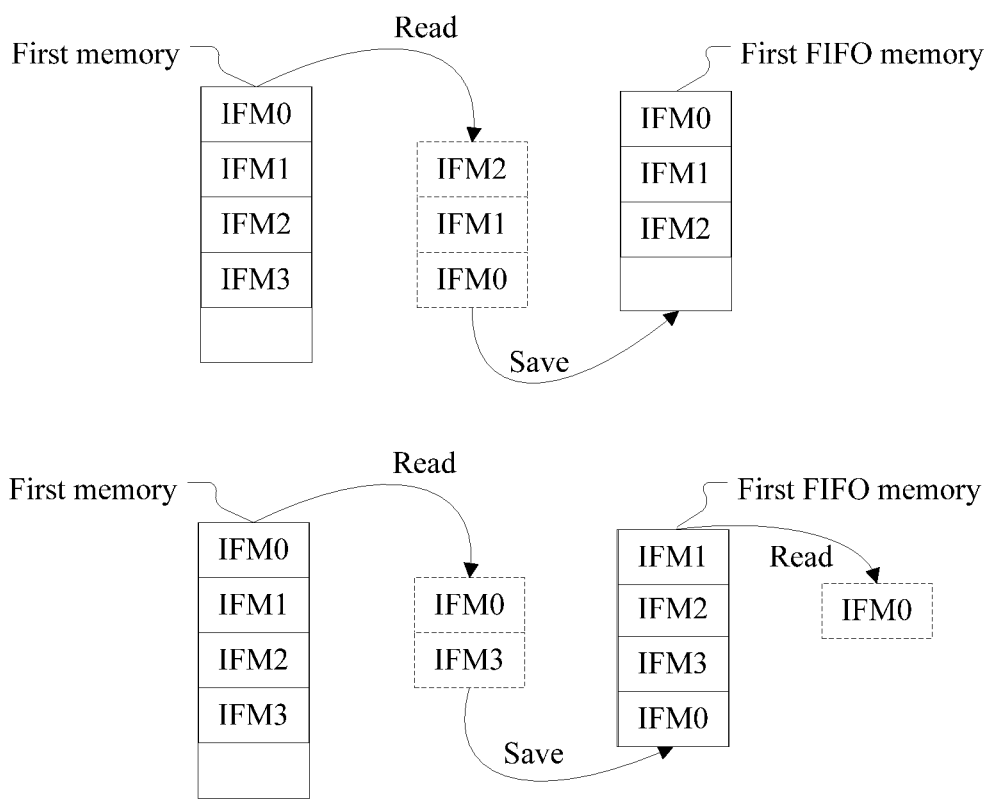
FIG. 4a is a schematic diagram of two-consecutive input image data transfer of an embodiment of the present disclosure.

For example, FIG. 4a illustrates a schematic diagram of two-consecutive input image data transfer of an embodiment of the present disclosure. Taking four input image data and four output image data as an example, number of image data to be transferred is sixteen equal to multiply four and four. IFM0, IFM1, IFM2 and IFM3 respectively represent four input image data. It is assumed that N is 3, a storage space occupied by one input image data is 128 bits, and a first available storage space of a first FIFO memory is 512 bits. Since the number of image data to be transferred is sixteen greater than zero, and the first available storage space is 512 bits greater than the storage space occupied by three input image data with a size of 384 bits equal to multiply 3 and 128, therefore, the terminal is configured to read three input image data (IFM0, IFM1, IFM2) from the first memory and then transfer to the first FIFO memory sequentially by the DMA, and an available storage space of the first FIFO memory is 128 bits (equal to 384 subtract from 512), and the number of image data to be transferred is thirteen equal to three subtract from sixteen. If in a next data transfer, the input image data IFM0 of the first FIFO memory is already read out, at this time, a remaining available storage space of the first FIFO memory is 256 bits equal to 128 plus 128 (128 bits released by the input image data IFM0). At this time, the number of image data to be transferred is thirteen equal to three subtract from sixteen and greater than zero, and the remaining available storage space of the first FIFO memory is 256 bits less than three input image data with a size of 384 bits (equal to multiply 3 and 128), the input image data, with a size of 256 bits (a size of two input image data IFM3, IFM0), is read from the first memory and then transferred to the first FIFO memory sequentially by the DMA, thereby there is no available storage space (256−256=0 bit) existing in the first FIFO memory. The number of image data to be transferred is eleven equal to three and two subtract from sixteen.

S307, detecting whether that number of weight data to be transferred is greater than zero.

S308, if the number of weight data to be transferred is greater than zero, detecting whether a second available storage space exists in a second FIFO memory.

S309, if there is no second available storage space existing in the second FIFO memory, recording all weight data information to be transferred in a second memory so as to wait for the available storage space to exist in the second FIFO memory.

S310, if the second available storage space exists in the second FIFO memory, detecting whether the second available storage space of the second FIFO memory is greater than or equal to a storage space occupied by the M weight data.

S311, if the second available storage space is greater than or equal to the storage space occupied by the M weight data, transferring the M weight data in the second memory to the second FIFO memory.

S312, if the second available storage space is smaller than the storage space occupied by the M weight data, transferring weight data read from the second memory and equal to a size of the second available storage space to the second FIFO memory.

In some feasible embodiments, the terminal is configured to receive input weight data and then store the weight data in the second memory in order. The terminal is configured to obtain the number of weight data in the second memory and then determine the number of weight data as a total number of weight data to be transferred. Wherein, the number of weight data can be a product of the number of input image data and the number of output image data. The terminal is configured to detect whether the number of weight data to be transferred is greater than zero. When the number of weight data to be transferred is equal to zero, the weight data is stopped to be transferred. When the number of weight data to be transferred is greater than zero, the terminal is configured to detect whether the second available storage space exists in the second FIFO memory. That is, detecting whether the second available storage space of the second FIFO memory is full. When there is no second available storage space existing in the second FIFO memory, it is indicated that the second available storage space of the second FIFO memory is full, the terminal is configured to record all weight data information to be transferred in the second memory so as to wait for the available storage space to exist in the second FIFO memory. Furthermore, the weight data information to be transferred is similar to the image data information to be transferred mentioned above, and includes some key registers of the weight data. When the available storage space exists in the second FIFO memory at a next time, the weight data can be transferred according to that the weight data information to be transferred is recorded in the second memory.

When the second available storage space is detected to exist in the second FIFO memory, it is indicated that the storage space of the second FIFO memory is not full. The terminal is configured to detect whether the second available storage space of the second FIFO memory is greater than or equal to the storage space occupied by the M weight data. When the second available storage space of the second FIFO memory is greater than or equal to the storage space occupied by the M weight data, the terminal can read the M weight data from the second memory and then transfer to the second FIFO memory via the direct memory access (DMA). When the second available storage space of the second FIFO memory is smaller than the storage space occupied by the M weight data, the terminal can read the weight data, equal to a size of the second available storage space, from the second memory and then transfer to the second FIFO memory via the direct memory access (DMA). After the weight image data is transferred to the second FIFO memory by the terminal, the terminal can subtract the number of transferred weight data from the number of weight data to be transferred so as to obtain a new number of weight data to be transferred. Furthermore, each weight data can include input indexes of one input image data and output indexes of one output image data. After the data is read from the second memory, the data stored in the second memory can't be changed. A width of the second FIFO memory is definite, that is, an amount of cacheable data per row in the second FIFO memory is equal. Due to a small amount of the weight data, in order to facilitate to read the weight data, each weight data in the second memory and the second FIFO memory can independently correspond to a row address.

Figure 4B:
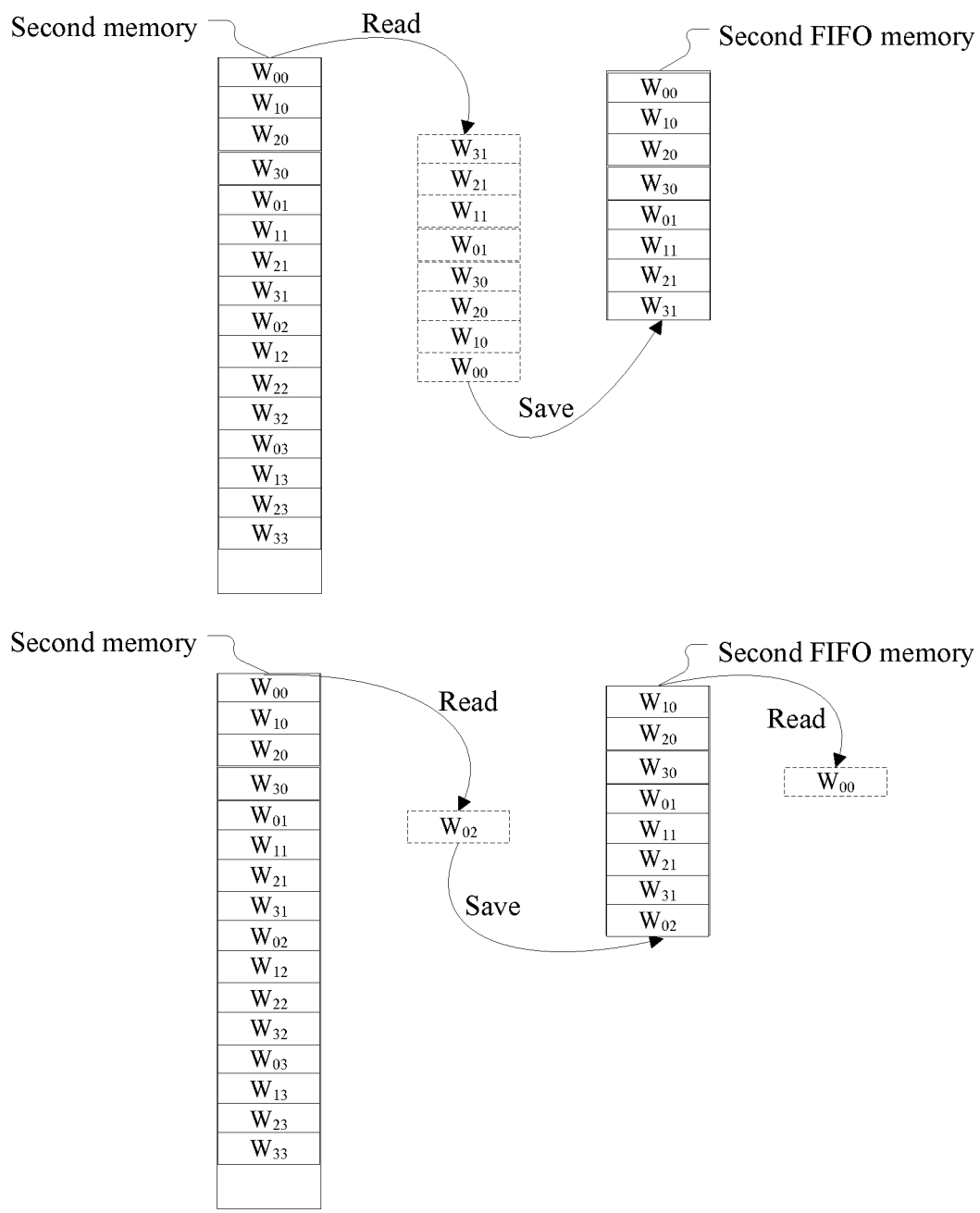
FIG. 4b is a schematic diagram of two-consecutive weight data transfer of an embodiment of the present disclosure.

For example, FIG. 4b illustrates a schematic diagram of two-consecutive weight data transfer of an embodiment of the present disclosure. Taking four input image data and four output image data as an example, the number of weight data is sixteen by multiplying four and four, and a total number of weight data to be transferred is sixteen. Wherein, the weight data represents by $W_{xy}$, a subscript x of $W_{xy}$ represents an input index of the input image data, and a subscript y of $W_{xy}$ represents an output index of the output image data. The first memory includes sixteen weight data $W_{00}$, $W_{10}$, $W_{20}$, $W_{30}$, $W_{01}$, $W_{11}$, $W_{21}$, $W_{31}$, $W_{02}$, $W_{12}$, $W_{22}$, $W_{32}$, $W_{03}$, $W_{13}$, $W_{23}$ and $W_{33}$. It is assumed that M is eight, one weight data is corresponding to one row address. It is assumed that the storage space corresponding to the one row address is 64 bits, and the storage space occupied by one weight data is also 64 bits. It is assumed that the second available storage space of the second FIFO memory is 512 bits. Since the number of weight data to be transferred is sixteen greater than zero, and the second available storage space is 512 bits equal to the storage space occupied by the eight weight data with a size of 512 bits equal to multiply 8 and 64, therefore, the terminal is configured to read eight weight data (that is, eight rows of weight data) from the second memory and transfer to the second FIFO memory sequentially via the DMA. And then, there is no available storage space with a size of zero equal to 512 subtract from 512 in the second FIFO memory after the weight data is transferred, and the number of image data to be transferred is eight equal to eight subtract from sixteen. Since there is no available storage space existing in the second FIFO memory at this time, the weight data in the second FIFO memory is waiting to be released, that is, waiting for the available storage space to again exist in the second FIFO memory. It is assumed that the weight data $W_{00}$ in the second FIFO memory has been read out at the beginning of a next data transfer, a remaining available storage space in the second FIFO memory is 64 bits (the size of 64 bits is freed by the weight data $W_{00}$). At this time, the number of image data to be transferred is eight equal to eight subtract from sixteen and greater than zero, the remaining available storage space of the second FIFO memory is 64 bits less than the eight weight data of 256 bits equal to multiply 8 and 64. The weight data with a size of 64 bits is read from the second memory (the weight data $W_{02}$), and then the weight data $W_{02}$ is transferred to the second FIFO memory in order via the DMA. So, there is no available storage space in the second FIFO memory (64−64=0 bit), and the number of the weight data to be transferred is seven equal to eight and one subtract from sixteen.

In some feasible embodiments, the step S301-S306 and the step S307-S312 can be performed in parallel, which isn't limited in embodiments of the present disclosure.

S313, when the number of input image data cached in the first FIFO memory and the number of weight data cached in the second FIFO memory are respectively greater than or equal to 1, performing a convolution operation on input image data i read from the first FIFO memory and weight data w read from the second FIFO memory, to obtain output image data corresponding to an output index of the weight data w; wherein i and w are integers.

In some feasible embodiments, an implementation mode of the step S313 of the present disclosure can be referred to an implementation mode of the step S103 shown in FIG. 1, which isn't be repeated here.

In some feasible embodiments, after output image data corresponding to the output index of the weight data w is obtained by the terminal, the output image data corresponding to the output index of the weight data w can be sequentially cached in a third FIFO memory, and it is detected whether a number of output image data cached in the third FIFO memory is greater than or equal to K. When the number of output image data cached in the third FIFO memory is greater than or equal to K, reading K output image data from the third FIFO memory and transferring to a third memory via the DMA. The terminal is configured to read the output image data stored in the third memory and then output the output image data. The terminal is also configured to compare the output image data with a preset output image data to evaluate hardware functions of a processor simulated by an instruction set simulator. In the instruction set simulator data processing process, the present disclosure is only simulated hardware functions of the processor (that is, functions of convolution operation), a plurality of input image data or a plurality of weight data in a memory can be transferred to a corresponding FIFO memory at a time, and it is performed convolution operation on one input image data and one weight data at a time, and the plurality of output image data in the FIFO memory can be transferred to a corresponding memory at a time, so that data is not limited by a hardware bus bandwidth during performing data transfer. Therefore, a data processing speed of the instruction set simulator can be improved so as to conveniently and quickly verify hardware functions of the processor. Furthermore, a width of the third FIFO memory is definite, that is, an amount of cacheable data per row in the third FIFO memory is equal. A size of each output image data is equal, that is, a storage space occupied by the each output image data is equal. K is an integer greater than or equal to 1.

In an embodiment of the present disclosure, when available storage spaces exist in an FIFO memory and a number of data to be transferred (the image data to be transferred or the weight data to be transferred) is not equal to zero, the terminal is configured to circularly transfer the input image data (a plurality of input image data to be transferred at a time) and the weight data (a plurality of weight data to be transferred at a time). When the number of data to be transferred is not equal to zero and no available storage space exists in the FIFO memory, an available storage space is waited for existing in the FIFO memory before the data can be transferred. When the number of data to be transferred is equal to zero, aft data transfer operation is not carried out. Finally, the terminal is configured to perform the convolution operation on transferred input image data and the transferred weight data to obtain the output image data. And then, the output image data is transferred from the FIFO memory to an output memory for a long-term storage. The data processing method of the present disclosure is provided for improving the data processing speed of the instruction set simulator and facilitating to quick verify hardware functions of the processor.

Figure 5:
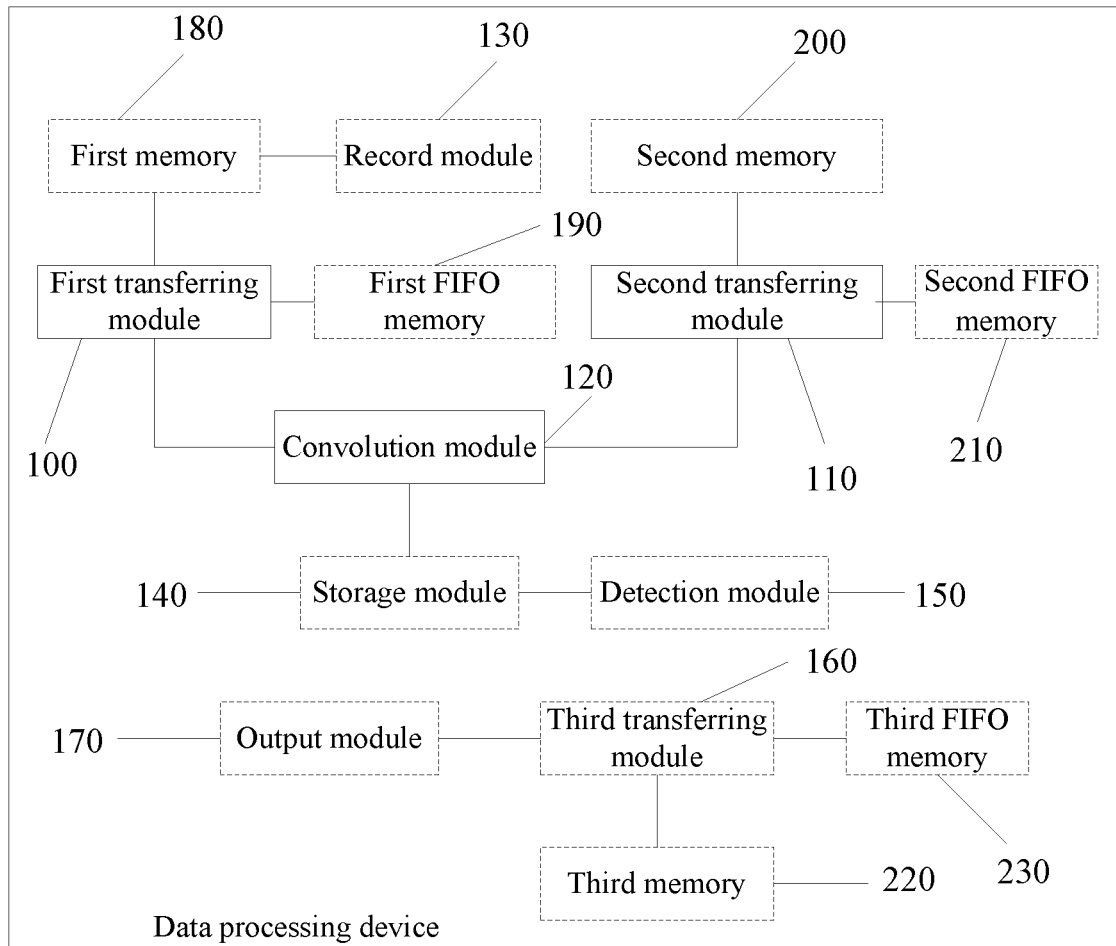
FIG. 5 is a schematic diagram of a data processing device in accordance with an embodiment of the present disclosure.

FIG. 5 illustrates a schematic diagram of a data processing device in accordance with an embodiment of the present disclosure. The data device includes:

a first transferring module 100 configured to transfer an N number of input image data in a first memory to a first first-in first-out (FIFO) memory when it is detected that a number of image data to be transferred is greater than zero wherein the number of image data is a product of a number of input image data and a number of output image data, and a first available storage space of the first FIFO memory is greater than or equal to a storage space occupied by the N input image data;

a second transferring module 110 configured to transfer an M number of weight data in a second memory to a second FIFO memory when it is detected that a number of weight data to be transferred is greater than zero wherein the number of weight data is a product of the number of input image data and the number of output image data, and a second available storage space of the second FIFO memory is greater than or equal to a storage space occupied by the M weight data; and wherein each weight data includes input indexes of input image data and output indexes of output image data; and a convolution module 120 configured to perform a convolution operation on input image data i read from the first FIFO memory and weight data w read from the second FIFO memory to obtain output image data corresponding to an output index of the weight data w, when the number of input image data cached in the first FIFO memory and the number of weight data cached in the second FIFO memory are greater than or equal to 1, and wherein an input index of the weight data w is corresponding to the input image data i, and N, M, i, and w are integers.

In some feasible embodiments, the first transferring module 100 is further configured to transfer the input image data read from the first memory and equal to a size of the first available storage space to the first FIFO memory, when it is detected that the number of image data to be transferred is greater than zero and the first available storage space is smaller than the storage space occupied by the N input image data.

In some feasible embodiments, the second transferring module 110 is further configured to transfer the weight data read from the second memory and equal to a size of the second available storage space to the second FIFO memory, when it is detected that the number of weight data to be transferred is greater than zero and the second available storage space is smaller than the storage space occupied by the M weight data.

In some feasible embodiments, the data processing device further includes a record module 130 configured to record all image data information to be transferred in the first memory so as to wait for the available storage space to exist in the first FIFO memory, when it is detected that the number of image data to be transferred is greater than zero and there is no available storage space existing in the first FIFO memory.

In some feasible embodiments, the data processing device further includes a storage module 140, a detection module 150, a third transferring module 160 and an output module 170. The storage module 140 is configured to sequentially store the output image data corresponding to an output index of the weight data w in a third FIFO memory. The detection module 150 is configured to detect whether the number of output image data stored in the third FIFO memory is greater than or equal to K; wherein K is an integer. The third transferring module 160 is configured to read an K number of output image data from the third FIFO memory and transfer to a third memory, when the number of output image data stored in the third FIFO memory is greater than or equal to K. The output module 170 is configured to read the output image data stored in the third memory and output the output image data.

In some feasible embodiments, the data processing device further includes a first memory 180, a first FIFO memory 190, a second memory 200, a second FIFO memory 210, a third memory 220 and a third FIFO memory 230. The first memory 180 is configured to sequentially store the input image data, the first FIFO memory 190 is configured to cache the input image data transferred from the first memory, the second memory 200 is configured to sequentially store the input weight data, the second FIFO memory 210 configured to cache the weight data transferred from the second memory; the third FIFO memory 220 configured to sequentially cache the output image data, and the third memory 230 configured to store the output image data transferred from the third FIFO memory 220.

In the concrete implementation, the data processing device can perform the implementations provided by the steps of FIG. 1 or FIG. 3 mentioned above via the above-mentioned modules to realize the functions of each embodiment mentioned above. For details, referring to the corresponding description provided by each step in the method embodiment shown in FIG. 1 or FIG. 3 above, which is not be repeated here.

In an embodiment of the present disclosure, when the data processing device detects that the number of image data to be transferred is greater than zero and the first available storage space of the first FIFO memory is greater than or equal to the storage space occupied by the N input image data, transferring the N input image data in the first memory to the first FIFO memory; and detects that the number of weight data to be transferred is greater than zero and the second available storage space of the second FIFO memory is greater than or equal to the storage space occupied by the M weight data, transferring the M weight data in a second memory to the second FIFO memory; and when the number of input image data cached in the first FIFO memory and the number of weight data cached in the second FIFO memory are respectively greater than or equal to 1, performing a convolution operation on the input image data i read from the first FIFO memory and the weight data w read from the second FIFO memory to obtain the output image data corresponding to the output index of the weight data w, which can improve the data processing speed of the instruction set simulator and facilitate to quick verify hardware functions of the processor. Wherein i and w are integers.

Figure 6:
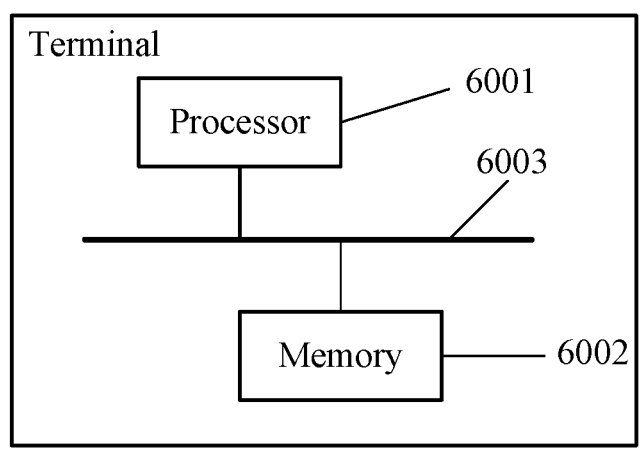
FIG. 6 is a schematic diagram of a terminal in accordance with an embodiment of the present disclosure.

FIG. 6 illustrates a schematic diagram of a terminal in accordance with an embodiment of the present disclosure. The terminal includes: one or more processors 6001 and memories 6002. The memory 6002 is connected with the processor 6001 via a bus 6003. The memory 6002 is configured to storing computer programs and the computer program includes a plurality of program instructions performed by the processor 6001. Wherein, the processor 6001 is configured to invoke the program instructions to implement:

if it is detected that number of image data to be transferred is greater than zero and a first available storage space of a first first-in first-out (FIFO) memory is greater than or equal to a storage space occupied by N input image data, transferring the N input image data in a first memory to the first FIFO memory;

if it is detected that the number of weight data to be transferred is greater than zero and a second available storage space of a second FIFO memory is greater than or equal to a storage space occupied by the M weight data, transferring the M weight data in a second memory to the second FIFO memory; and wherein each weight data includes input indexes of input image data and output indexes of output image data;

when the number of input image data cached in the first FIFO memory and the number of weight data cached in the second FIFO memory are respectively greater than or equal to 1, performing the convolution operation on the input image data i read from the first FIFO memory and the weight data w read from the second FIFO memory, to obtain output image data corresponding to an output index of the weight data w, and an input index of the weight data w corresponding to the input image data i.

It can be understood that, in an embodiment of the present disclosure, the so-called processor 6001 can be a central processing unit (CPU), and also can be other general-purpose processors, digital signal processors (DSPS), application specific integrated circuits (ASIC), field-programmable gate arrays (FPGA), or other programmable logic devices, discrete gates or transistor logic devices, discrete hardware components, etc. The general-purpose processor can be a microprocessor or any general-purpose processor, etc.

The memory 6002 can include a read-only memory and a random-access memory and provide instructions and data to the processor 6001. A part of the memory 6002 can also include a non-volatile random access memory. For example, the memory 6002 can also store type information of devices.

In the concrete implementation, the processor 6001 of embodiments of the present disclosure can perform the implementations described in the data processing method provided in embodiments of the present disclosure, and also can perform the implementations described in the data processing device provided in embodiments of the present disclosure, which is not be repeated here.

What is claimed is:

1. A data processing method comprising:
if it is detected that a number of image data to be transferred is greater than zero wherein the number of image data is a product of a number of input image data and a number of output image data, and a first available storage space of a first first-in first-out (FIFO) memory is greater than or equal to a storage space occupied by an N number of input image data, transferring the N input image data in a first memory to the first FIFO memory;

if it is detected that a number of weight data to be transferred wherein the number of weight data is a product of the number of input image data and the number of output image data, is greater than zero and a second available storage space of a second FIFO memory is greater than or equal to a storage space occupied by an M number of weight data, transferring the M weight data in a second memory to the second FIFO memory; and wherein each weight data comprises input indexes of input image data and output indexes of output image data; and when the number of input image data cached in the first FIFO memory and the number of weight data cached in the second FIFO memory are respectively greater than or equal to 1, performing a convolution operation on input image data i read from the first FIFO memory and weight data w read from the second FIFO memory, to obtain output image data corresponding to an output index of the weight data w, and an input index of the weight data w corresponding to the input image data i; and wherein N, M, i, and w are integers.

2. The data processing method as claimed in claim 1, wherein the data processing method further comprises: if it is detected that the number of image data to be transferred is greater than zero and the first available storage space is smaller than the storage space occupied by the N input image data, transferring the input image data read from the first memory and equal to a size of the first available storage space to the first FIFO memory.

3. The data processing method as claimed in claim 1, wherein the data processing method further comprises: if it is detected that the number of weight data to be transferred is greater than zero and the second available storage space is smaller than the storage space occupied by the M weight data, transferring the weight data read from the second memory and equal to a size of the second available storage space to the second FIFO memory.

4. The data processing method as claimed in claim 1, wherein the data processing method further comprises: if it is detected that the number of image data to be transferred is greater than zero and there is no available storage space in the first FIFO memory, recording all image data information to be transferred in the first memory so as to wait for the available storage space existing in the first FIFO memory.

5. The data processing method as claimed in claim 1, wherein after obtaining the output image data corresponding to the output index of the weight data w, the method further comprises: sequentially storing the output image data corresponding to the output index of the weight data w in a third FIFO memory;
detecting whether the number of output image data stored in the third FIFO memory is greater than or equal to K, wherein K is an integer;
if the number of output image data stored in the third FIFO memory is greater than or equal to K, reading K output image data from the third FIFO memory and transferring the K output image data to a third memory; and
reading the output image data stored in the third memory and then outputting the output image data.

6. A data processing device comprising:
a first transferring module configured to transfer an N number of input image data in a first memory to a first first-in first-out (FIFO) memory when it is detected that a number of image data to be transferred is greater than zero wherein the number of image data is a product of a number of input image data and a number of output image data, and a first available storage space of the first FIFO memory is greater than or equal to a storage space occupied by the N input image data;

a second transferring module configured to transfer an M number of weight data in a second memory to a second FIFO memory when it is detected that a number of weight data to be transferred is greater than zero wherein the number of weight data is a product of the number of input image data and the number of output image data, and a second available storage space of the second FIFO memory is greater than or equal to a storage space occupied by the M weight data; and wherein each weight data comprises input indexes of input image data and output indexes of output image data;

a convolution module configured to perform a convolution operation on input image data i read from the first FIFO memory and weight data w read from the second FIFO memory, to obtain output image data corresponding to an output index of the weight data w, when the number of input image data cached in the first FIFO memory and the number of weight data cached in the second FIFO memory are respectively greater than or equal to 1, and wherein an input index of the weight data w is corresponding to the input image data i, and N, M, i, and w are integers.

7. The data processing device as claimed in claim 6, wherein the first transferring module is further configured to transfer the input image data read from the first memory and equal to a size of the first available storage space to the first FIFO memory, when it is detected that the number of image data to be transferred is greater than zero and the first available storage space is smaller than the storage space occupied by the N input image data.

8. The data processing device as claimed in claim 6, wherein the second transferring module is further configured to transfer the weight data read from the second memory and equal to a size of the second available storage space to the second FIFO memory, when it is detected that the number of weight data to be transferred is greater than zero and the second available storage space is smaller than the storage space occupied by the M weight data.

9. A terminal comprising a processor and a memory connected to the processor and storing computer programs with program instructions which is performed by the processor to implement a data processing method; the method comprising:

if it is detected that a number of image data to be transferred is greater than zero wherein the number of image data is a product of a number of input image data and a number of output image data, and a first available storage space of a first first-in first-out (FIFO) memory is greater than or equal to a storage space occupied by an N number of input image data, transferring the N input image data in a first memory to the first FIFO memory;

if it is detected that a number of weight data to be transferred is greater than zero wherein the number of weight data is a product of the number of input image data and the number of output image data, and a second available storage space of a second FIFO memory is greater than or equal to a storage space occupied by an M number of weight data, transferring the M weight data in a second memory to the second FIFO memory; and wherein each weight data comprises input indexes of input image data and output indexes of output image data; and when the number of input image data cached in the first FIFO memory and the number of weight data cached in the second FIFO memory are respectively greater than or equal to 1, performing a convolution operation on input image data i read from the first FIFO memory and weight data w read from the second FIFO memory, to obtain output image data corresponding to an output index of the weight data w, and an input index of the weight data w corresponding to the input image data i, wherein N, M, i, and w are integers.

* * * * *